United States Patent [19]
Nakayama

[11] Patent Number: 5,974,555
[45] Date of Patent: Oct. 26, 1999

[54] PIPELINE PROCESSING APPARATUS HAVING SMALL POWER CONSUMPTION

[75] Inventor: Takashi Nakayama, Tokyo, Japan

[73] Assignee: NEC Corporation, Tokyo, Japan

[21] Appl. No.: 08/284,113

[22] Filed: Aug. 2, 1994

[30] Foreign Application Priority Data

Aug. 3, 1993 [JP] Japan .................................. 5-210932

[51] Int. Cl.⁶ ........................................................ G06F 1/32
[52] U.S. Cl. ............................................................ 713/322
[58] Field of Search .................................. 395/750, 725, 395/550, 375; 307/582, 409; 712/235; 713/322

[56] References Cited

U.S. PATENT DOCUMENTS

| | | | |
|---|---|---|---|
| 4,463,440 | 7/1984 | Nishiura et al. | 713/400 |
| 4,573,117 | 2/1986 | Boney | 713/330 |
| 4,615,005 | 9/1986 | Maejima et al. | 713/601 |
| 4,669,059 | 5/1987 | Little et al. | 713/330 |
| 5,203,003 | 4/1993 | Donner | 713/322 |
| 5,386,585 | 1/1995 | Traylor | 710/127 |
| 5,392,423 | 2/1995 | Yetter | 713/503 |

FOREIGN PATENT DOCUMENTS

| | | |
|---|---|---|
| 60-59441 | 4/1985 | Japan . |
| 60-095643 | 5/1985 | Japan . |
| 3-10306 | 1/1991 | Japan . |
| 4-181409 | 6/1992 | Japan . |
| 2310422 | 10/1992 | Japan . |
| 5135592 | 1/1993 | Japan . |

OTHER PUBLICATIONS

Mukherjee, "Introduction to nMDS & CMOS VLSI Systems Design", 1986, pp. 76–93.

Hennessy et al., "Computer Architecture A Quantitative Approach" 1990 pp. 251–261, 284–285.

Weste et al., "Principles of CMOS VLSI Design . . . " 1985 pp. 11,13, 166–167, 163–164.

Neil Weste et al, "Principles of CMOS VLSI Design A System Perspective", AT&T Bell Labs, Inc., pp. 144–149 (1985).

"The Architecture of Pipelined Computers"; Peter M. Kogge; IBM Federal Systems Division; Hemisphere Publishing Corporation; Nov. 1985; pp. 27–33.

"Circuit Implementation of High–Speed Pipeline Systems"; Leonard W. Cotten; Proceedings of the Fall Joint Computer Conference; 1965; pp. 489–504.

"Pipelining of GAAS Dynamic Logic Circuits"; David H.K. Hoe and C. Andre T. Salama; 1992 IEEE International Symposium on Circuits and Systems; May 1992; pp. 208–211.

*Primary Examiner*—Zarni Maung
*Assistant Examiner*—Kenneth R. Coulter
*Attorney, Agent, or Firm*—Whitham, Curtis & Whitham

[57] ABSTRACT

A pipeline processing apparatus having reduced power consumption including a plurality of serially connected stages, a plurality of clock signals different in phase from each other supplied to the stages individually. The clock signals can be stopped independently, so as to limit power consumption.

5 Claims, 8 Drawing Sheets

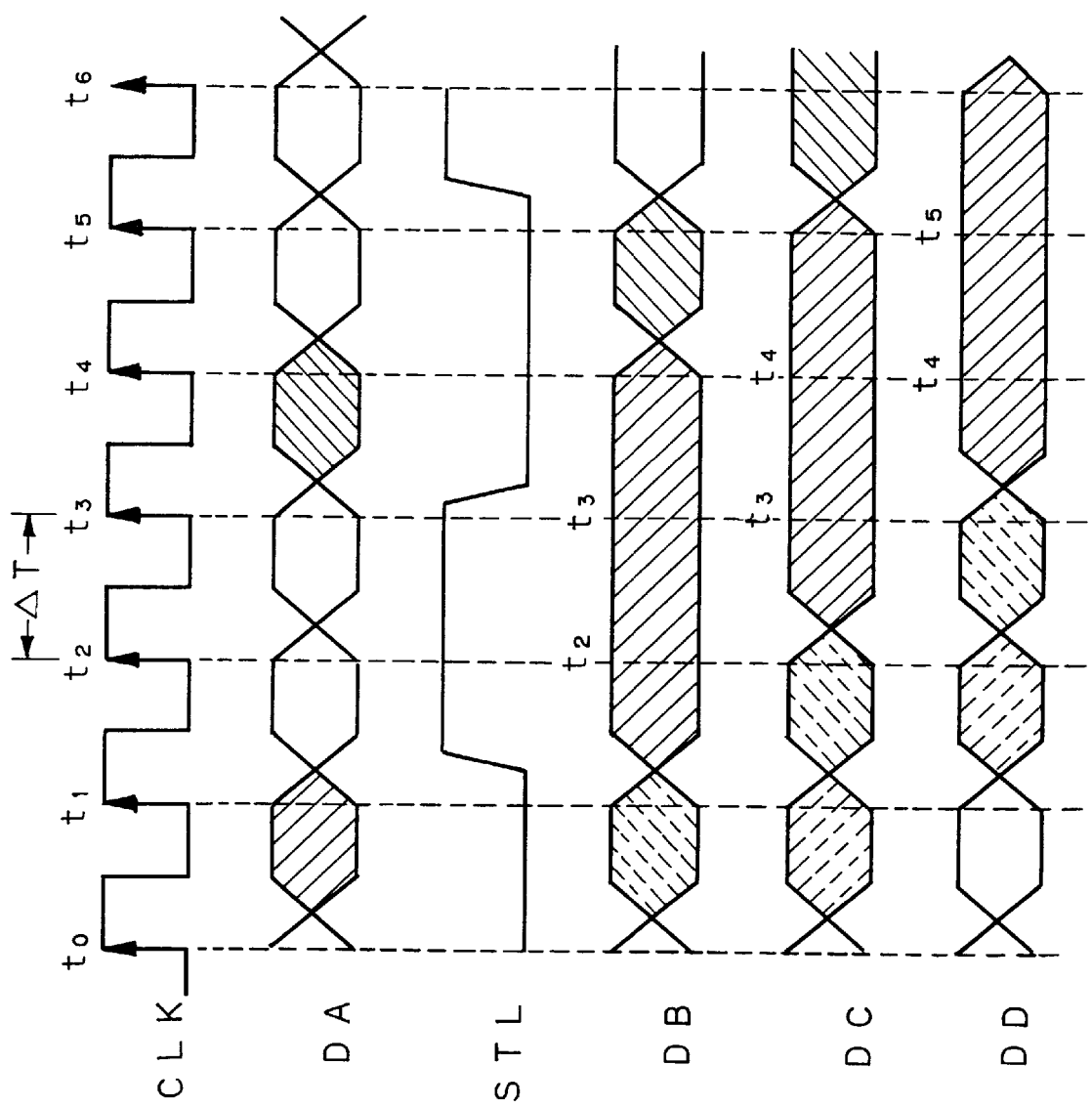

PIPELINE PROCESSING APPARATUS HAVING SMALL POWER CONSUMPTION

BACKGROUND OF THE INVENTION

1. Field of the Invention

The present invention relates to a pipeline processing apparatus including a plurality of serially-connected stages, each stage having a plurality of flip-flops and a logic gate combination circuit.

2. Description of the Related Art

A microprocessor such as a pipeline processing apparatus includes a plurality of stages each having a plurality of flip-flops and a logic gate combination circuit. About half of the entire power consumption is dissipated in the flip-flops. Also, about half of that half is dissipated in a clock driving circuit for driving a clock signal supplied to the flip-flops, and the remainder of that half is dissipated in the flip-flops per se and their outputs.

Generally, in a complementary metal oxide semiconductor (CMOS) large scale integrated circuit (LSI), power consumption is mainly dependent upon dynamic power consumption caused by charging and discharging operations performed upon a load capacity, and can be represented by (see Neil Weste et al, "PRINCIPLES OF CMOS VLSI DESIGN", pp. 144–149, 1985)

$$P = C_L V_{DD}^2 f_p \qquad (1)$$

where

P is a power consumption;

$C_L$ is a load capacity;

$V_{DD}$ is a power supply voltage; and $f_p$ is the frequency of a signal.

If the signal is a clock signal whose frequency is $f_c$, then $f_p = f_c$. If the signal is an output signal of a flip-flop, then $f_p \approx \frac{1}{4} f_c$ in view of the probability of transition of the output signal from high to low and vice versa.

In the pipeline processing apparatus, however, the output signals of the flip-flops are not always changed from high to low or vice versa in accordance with the clock signal. Each output signal of the flip-flops may be changed once for ten clock signals on the average, and in this case, $f_p \approx \frac{1}{10} f_c$. This means about 90% of the power consumption dissipated in the clock driver circuit can be wasted. This will be explained later in detail.

SUMMARY OF THE INVENTION

It is an object of the present invention to reduce the power consumption of a pipeline processing apparatus including a plurality of serially-connected stages each having at least a plurality of flip-flops.

According to the present invention, in a pipeline processing apparatus including a plurality of serially connected stages, a plurality of clock signals are supplied to the stages individually. The clock signals can be individually stopped, so that wasteful transitions of the clock signals are reduced.

BRIEF DESCRIPTION OF THE DRAWINGS

The present invention will be more clearly understood from the description as set forth below, in comparison with the prior art, with reference to the accompanying drawings, wherein:

FIGS. 2A 2B, 2C, 2D, 2E, and 2F are timing diagrams showing the operation of the circuit of FIG. 1;

DESCRIPTION OF THE PREFERRED EMBODIMENT

Before the description of the preferred embodiment, a prior art pipeline processing apparatus will be explained with reference to FIGS. 1, 2A through 2F, and 3A and 3B.

Figure 1:
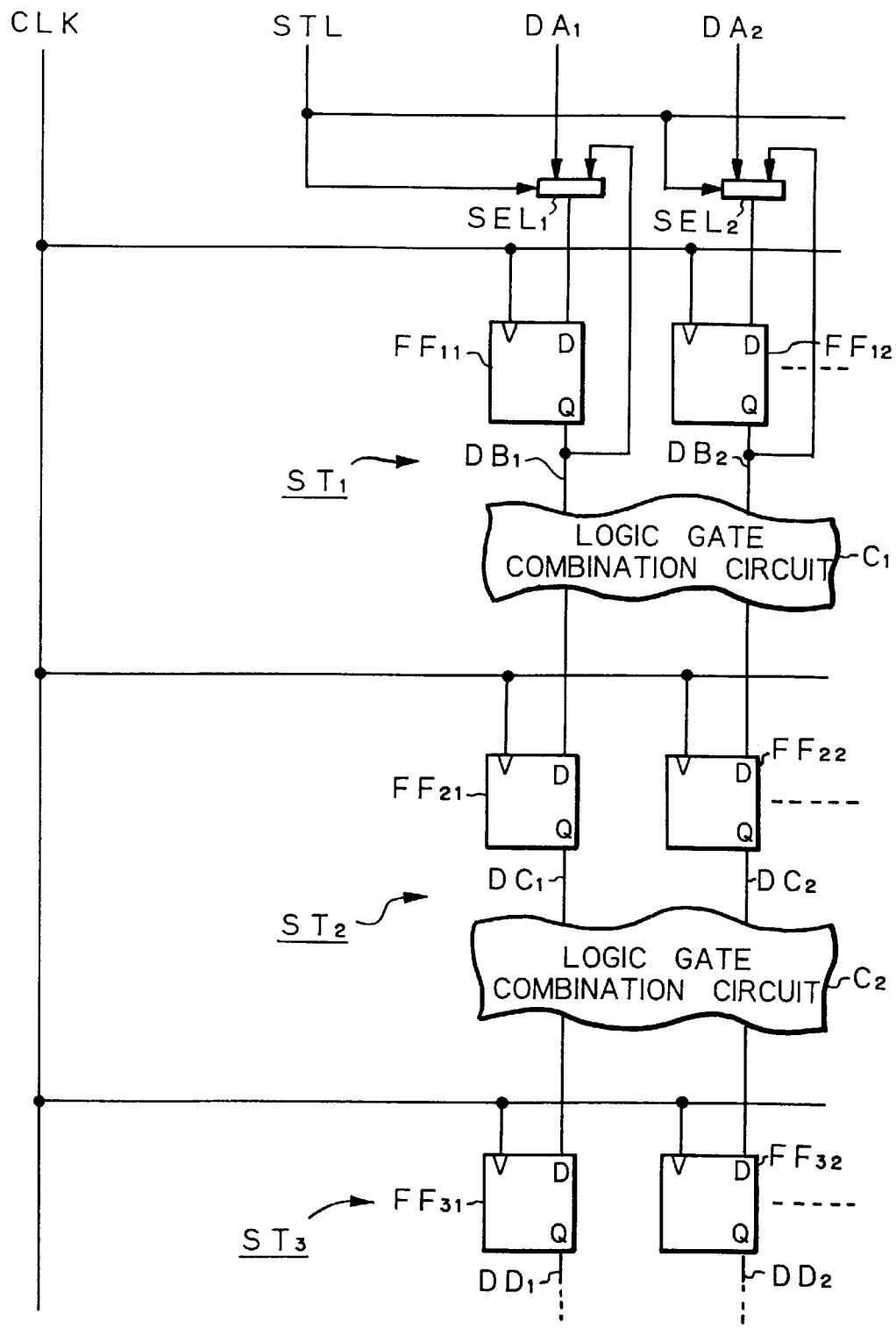
FIG. 1 is a circuit diagram illustrating a prior art pipeline processing apparatus.

In FIG. 1, which illustrates a prior art pipeline processing apparatus, a plurality of stages $ST_1$, $ST_2$, ... are provided. The first stage $ST_1$ is comprised of flip-flops $FF_{11}$, $FF_{12}$, ... for receiving data $DA_1$, $DA_2$, ..., respectively, and a logic gate combination circuit $C_1$ for receiving the output data $DB_1$, $DB_2$, ... of the flip-flops $FF_{11}$, $FF_{12}$, .... In this case, the flip-flops $FF_{11}$, $FF_{12}$, ... are of a D-type which operate in response to their input rise edges. Note that the logic gate combination circuit $C_1$ is comprised of logic gates such as AND circuits, NAND circuits, OR circuits and NOR circuits, but includes no flip-flop and no latch circuit. Also, the data $DA_1$, $DA_2$, ... are supplied to the first stage $ST_1$ through selectors $SEL_1$, $SEL_2$, ... which are controlled by a stall signal STL for stopping the pipeline operation of the pipeline processing apparatus. That is, when the stall signal STL is low (="0"), the data $DA_1$, $DA_2$, ... are supplied to the flip-flops $FF_{11}$, $FF_{12}$, ..., so that the contents of the flip-flops $FF_{11}$, $FF_{12}$, ... are changed. On the other hand, when the stall signal STL is high (="1"), the output signals of the flip-flops $FF_{11}$, $FF_{12}$, ... are fed back to the inputs thereof, so that the contents of the flop-flops $FF_{11}$, $FF_{12}$, ... are not changed.

Also, the second stage $ST_2$ is comprised of flip-flops $FF_{21}$, $FF_{22}$, ..., and a logic gate combination circuit $C_2$ for receiving the output data $DC_1$, $DC_2$, ... of the flip-flops $FF_{21}$, $FF_{22}$, .... The third stage $ST_3$ and its post-stages have the same configuration as the second stage $ST_2$.

Further, a clock signal CLK is supplied to all the flip-flops $FF_{11}$, $FF_{12}$, ..., $FF_{21}$, $FF_{22}$, ..., $FF_{31}$, $FF_{32}$, ..., and therefore, the flip-flops $FF_{11}$, $FF_{12}$, ..., $FF_{21}$, $FF_{22}$, ..., $FF_{31}$, $FF_{32}$, ... are simultaneously operated.

The operation of the pipeline processing apparatus of FIG. 1 will now be explained with reference to FIGS. 2A through 2F.

As shown in FIGS. 2A and 2B, the clock signal CLK and the data DA ($DA_1$, $DA_2$, ... ) are always generated. In this state, as shown in FIG. 2C, the stall signal STL is "0" at rise-edge timings $t_0$, $t_1$, $t_4$ and $t_5$ of the clock signal CLK, so that the selectors $SEL_1$, $SEL_2$, ... select the data DA. As a result, the output data DB ($DB_1$, $DB_2$, ... ) of the flip-flops $FF_{11}$, $FF_{12}$, . . . are data obtained by delaying the data DA by one clock time period $\Delta T$, as shown in FIG. 2D. On the other hand, as shown in FIG. 2C, the stall signal STL is "1" at rise edge timings $t_2$, $t_3$ and $t_6$ of the clock signal CLK, so that the output data DB of the flip-flops $FF_{11}$ $FF_{12}$, . . . are not changed as shown in FIG. 2D. Also, the second stage $ST_2$ and its post stages always receive the clock signal CLK, and therefore, the operation results of the logic gate combination circuits $C_1$, $C_2$, . . . based upon the outputs of their prestage flip-flops are written into the flip-flops of the second stage $ST_2$ and its post stages, as shown in FIGS. 2E and 2F.

In the pipeline processing apparatus of FIG. 1, however, even during time periods where the contents of the flip-flops are not changed due to the stall signal STL, the flip-flops receive the clock signal CLK so as to operate them (see $t_2$ and $t_3$ of FIG. 2D, $t_3$ and $t_4$ of FIG. 2E and $t_4$ and $t_5$ of FIG. 2F). This increases the power consumption.

Figure 3A:
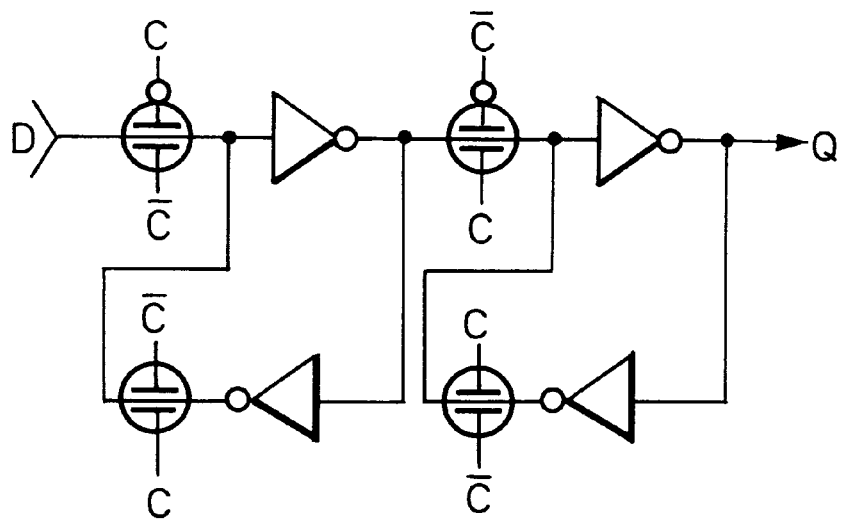
FIGS. 3A and 3B are circuit diagrams illustrating examples of flop-flops.

For example, if each of the flip-flops is of a static type as illustrated in FIG. 3A, the power consumption of the pipeline processing apparatus of FIG. 1 is calculated below. Here, the following conditions are assumed:

an input capacity of the clock signal CLK to each flip-flop=0.06 pF;

an internal load capacity of each flip-flop=0.07 pF;

an input capacity of the stall signal STL to each of the selectors $SEL_1$, $SEL_2$, . . . =0.04 pF;

an internal load capacity of each of the selectors $SEL_1$, $SEL_2$, . . . =0.05 pF;

the number of the flip-flops $FF_{11}$, $FF_{12}$, . . . =40;

the number of the flip-flops $FF_{21}$, $FF_{22}$, . . . =20;

the number of the flip-flops $FF_{31}$, $FF_{32}$, . . . =30;

an internal load capacity of the logic gate combination circuit $C_1$=20 pF;

an internal load capacity of the logic gate combination circuit $C_2$=10 pF;

$V_{DD}$=5V;

the frequency $f_c$ of the clock signal CLK=50 $MH_z$;

the probability of "1" within the stall signal STL=⅖, i.e., the frequency of the stall signal STL=⅖·50 $MH_z$; and the frequency of other logic signals=$f_s/4$ (due to the fact that the probability of transition of the output signal of each flip-flop at unstalled timings where the output signal is expected to change is ½, i.e., the transtion frequency is ¼ $f_s$).

Therefore, from the equation (1), $$P = (40+20+30) \cdot 0.06 \cdot 10^{-12} \times 5^5 \times 50 \cdot 10^6 + \quad (2)$$

$$(40+20+30) \cdot 0.07 \cdot 10^{-12} \times 5^2 \times 1/4 \cdot 2/5 \cdot 50 \cdot 10^6 +$$

$$40 \cdot 0.04 \cdot 10^{-12} \times 5^2 \times 2/5 \cdot 50 \cdot 10^6 +$$

$$40 \cdot 0.05 \cdot 10^{-12} \times 5^2 \times 1/4 \cdot 2/5 \cdot 50 \cdot 10^6 +$$

$$(20+10) \cdot 10^{-12} \times 5^2 \times 1/4 \cdot 2/5 \cdot 50 \cdot 10^6$$

where the first term is a power consumption dissipated by the clock signal CLK; the second term is a power consumption dissipated within the flip-flops; the third term is a power consumption dissipated by the stall signal STL; the fourth term is a power consumption dissipated in the selectors $SEL_1$, $SEL_2$, . . . ; and the fifth term is a power consumption dissipated in the logic gate combination circuits $C_1$ and $C_2$. The equation (2) is represented by $$P = (6.75 + 0.79 + 0.80 + 0.25 + 3.75) \cdot 10^{-3} \quad (3)$$

$$= 12.34 \text{mW}$$

Thus, 55 percent of the entire power consumption (12.34 mW) is dissipated by the clock signal CLK, and ⅖ of this power consumption (22 percent of the entire power consumption) is dissipated when the pipeline processing apparatus is stalled. Also, 9 percent (0.80+0.25 mW) of the entire power consumption is dissipated in the selectors $SEL_1$, $SEL_2$, . . . . In other words, 31 percent of the entire power consumption does not contribute to the pipeline operation of the pipeline processing apparatus, and therefore, the 31 percent of the entire power consumption is wasteful.

Figure 3B:
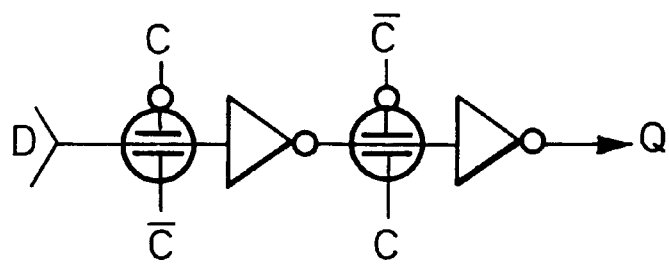

On the other hand, if each of the flip-flops is of a dynamic type as illustrated in FIG. 3B, since the number of transistors is reduced as compared with the static type flip-flop as illustrated in FIG. 3B, the input capacity of the clock signal CLK to each flip-flop is decreased from 0.06 pF to 0.03 pF, and the internal load capacity of each flip-flop is decreased from 0.07 pF to 0.04 pF. Therefore, the first term of the equation (2) is replaced by $(40+20+30) \cdot 0.03 \cdot 10^{-12} \times 5^2 \times 50 \cdot 10^6$ and the second term of the equation (2) is replaced by $(40+20+30) \cdot 0.04 \cdot 10^{-12} \times 5^2 \times ¼ \cdot ⅖ \times 50 \cdot 10^6$ Therefore, in this case, the entire power consumption P is represented by $$P = (3.38 + 0.45 + 0.80 + 0.25 + 3.75) \cdot 10^{-3} \quad (4)$$

$$= 8.63 \text{mW}$$

Thus, 39 percent of the entire power consumption (8.63 mW) is dissipated by the clock signal CLK, and ⅖ of this power consumption (16 percent of the entire power consumption) is dissipated when the pipeline processing apparatus is stalled. Also, 12 percent (0.80+0.25 mW) of the entire power consumption is dissipated in the selectors $SEL_1$, $SEL_2$, . . . . In other words, 28 percent of the entire power consumption does not contribute to the pipeline operation of the pipeline processing apparatus, and therefore, the 28 percent of the entire power consumption is wasteful.

Figure 4:
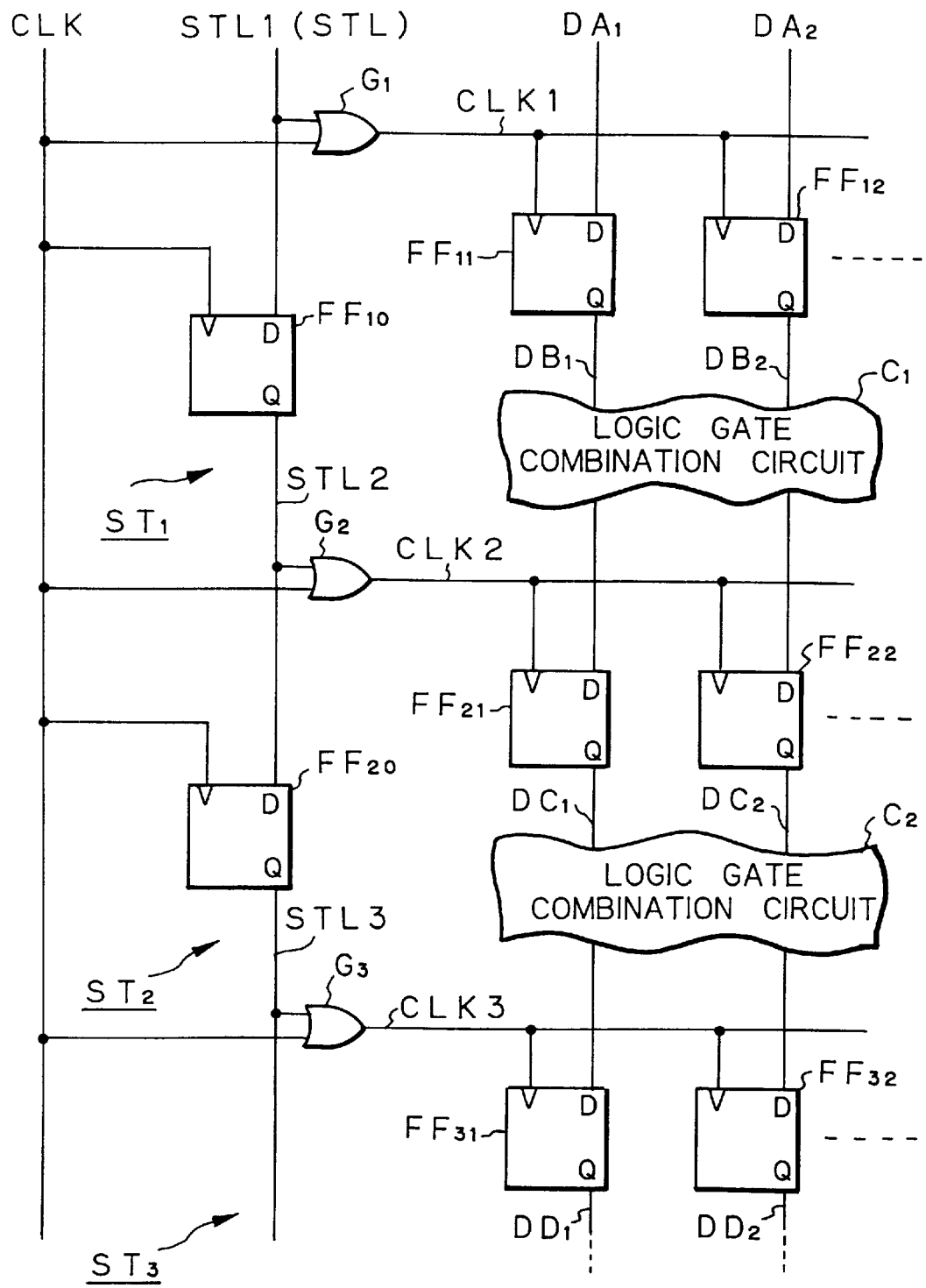
FIG. 4 is a circuit diagram illustrating a first embodiment of the pipeline processing apparatus according to the present invention.

In FIG. 4, which illustrates a first embodiment of the present invention using static type flip-flops as illustrated in FIG. 3A, flip-flops $FF_{10}$, $FF_{20}$, . . . and OR circuits $G_1$, $G_2$, $G_3$, . . . are added to the elements of FIG. 1, and the selectors $SEL_1$, $SEL_2$, . . . of FIG. 1 are deleted. Each of the flip-flops $FF_{10}$, $FF_{20}$, . . . delays stall signals STL1 (=STL), STL2, . . . by one clock time period $\Delta T$. The OR circuits $G_1$, $G_2$, $G_3$, . . . turn ON and OFF the clock signal in accordance with the stall signals STL1, STL2, STL3, . . . . Thus, the stall signals STL1, STL2, STL3, . . . having one clock time period $\Delta T$ therebetween are generated. As a result, the flip-flops $FF_{11}$, $FF_{12}$, . . . are operated in accordance with a clock signal CLK1 which is an OR logic between the clock signal CLK and the stall signal STL1, the flip-flops $FF_{21}$, $FF_{22}$, . . . are operated in accordance with a clock signal CLK2 which is an OR logic between the clock signal CLK and the stall signal STL2, and the flip-flops $FF_{31}$, $FF_{32}$, . . . are operated in accordance with a clock signal CLK3 which is an OR logic between the clock signal CLK and the stall signal STL3.

The operation of the pipeline processing apparatus of FIG. 4 will now be explained with reference to FIGS. 5A through 5K.

Figure 5:
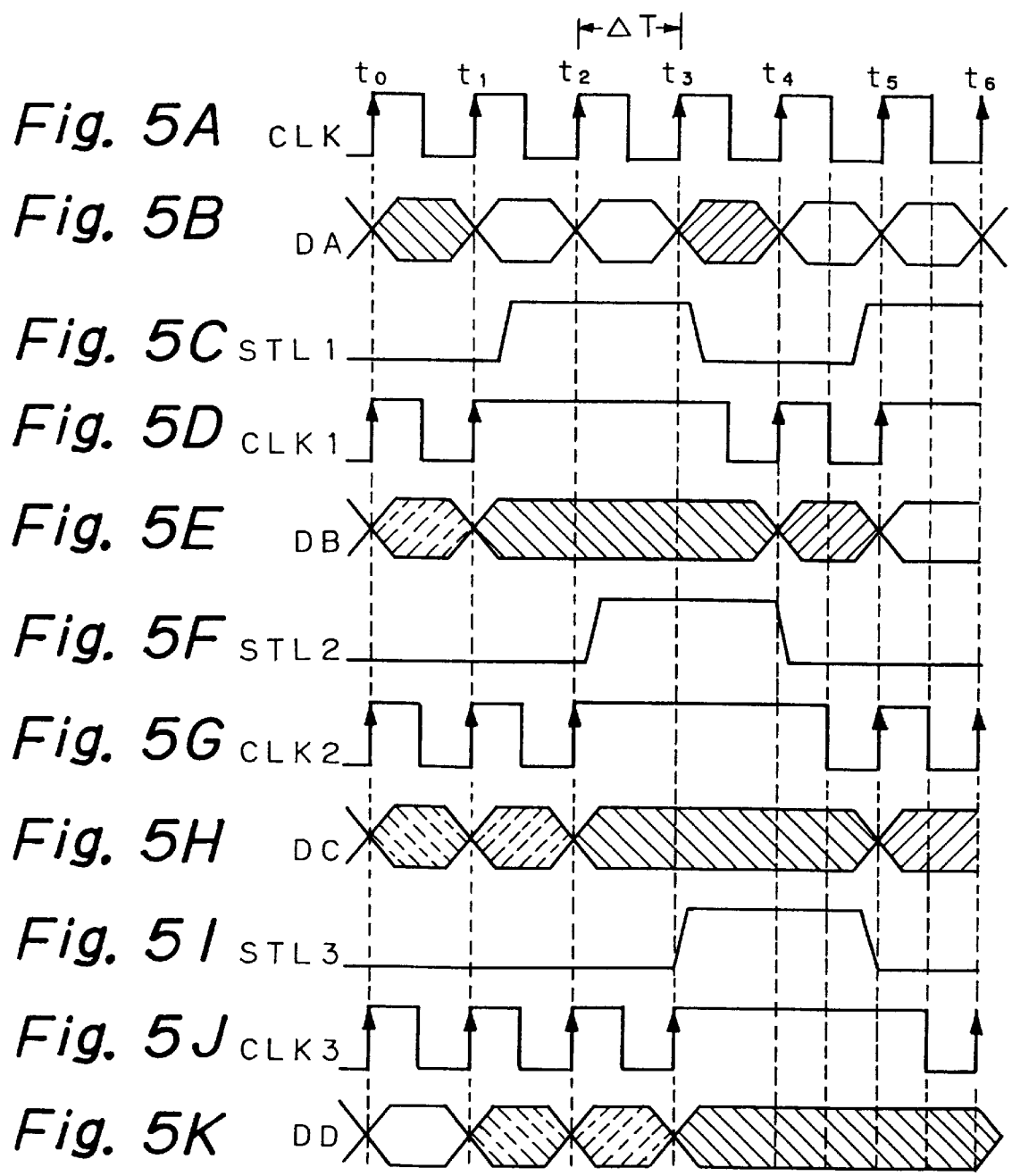
FIGS. 5A 5B, 5C, 5D, 5E, 5F, 5G, 5H, 5I, 5J, and 5K are timing diagrams showing the operation of the circuit of FIG. 4.

As shown in FIGS. 5A and 5B, the clock signal CLK and the data DA (DA$_1$, DA$_2$, . . . ) are also always generated. In this state, as shown in FIG. 5C, the stall signal STL1 is "0" at rising-edge timings t$_0$, t$_1$, t$_4$ and t$_5$ of the clock signal CLK and is "1" at rising edge timings t$_2$, t$_3$ and t$_6$ of the clock signal CLK. As a result, the clock signal CLK1 for the flip-flops FF$_{11}$, FF$_{12}$, . . . rises at only timings t$_0$, t$_1$, t$_4$ and t$_5$, as shown in FIG. 5D. Therefore, the data DB (DB$_1$, DB$_2$, . . . ) of the flip-flops FF$_{11}$, FF$_{12}$, . . . are changed at only timings t$_0$, t$_1$, t$_4$ and t$_5$, as shown in FIG. 5E, and therefore, the output data DB are obtained by delaying the data DA by one clock time period ΔT.

Also, as shown in FIG. 5F, the stall signal STL2 is delayed as compared with the stall signal STL1 by one clock time period ΔT. Therefore, as shown in FIG. 5F, the stall signal STL2 is "0" at rising-edge timings t$_0$, t$_1$, t$_2$, t$_5$ and t$_6$ of the clock signal CLK and is "1" at rising edge timings t$_3$ and t$_4$ of the clock signal CLK. As a result, the clock signal CLK2 for the flip-flops FF$_{21}$, FF$_{22}$, . . . rises at only timings t$_0$, t$_1$, t$_2$, t$_5$ and t$_6$, as shown in FIG. 5G. Therefore, the data DC (DC$_1$, DC$_2$, . . . ) of the flip-flops FF$_{21}$, FF$_{22}$, . . . are changed at only timings t$_0$, t$_1$, t$_2$, t$_5$ and t$_6$, as shown in FIG. 5H, and therefore, the output data DC are obtained by delaying the data DB by one clock time period ΔT.

Also, as shown in FIG. 5I, the stall signal STL3 is delayed as compared with the stall signal STL2 by one clock time period ΔT. Therefore, as shown in FIG. 5I, the stall signal STL3 is "0" at rising-edge timings t$_0$, t$_1$, t$_2$, t$_3$ and t$_6$ of the clock signal CLK and is "1" at rising edge timings t$_4$ and t$_5$ of the clock signal CLK. As a result, the clock signal CLK3 for the flip-flops FF$_{31}$, FF$_{32}$, . . . rises at only timings t$_0$, t$_1$, t$_2$, t$_3$ and t$_6$, as shown in FIG. 5J. Therefore, the data DD (DD$_1$, DD$_2$, . . . ) of the flip-flops FF$_{31}$, FF$_{32}$, . . . are changed at only timings t$_0$, t$_1$, t$_2$ t$_3$ and t$_6$, as shown in FIG. 5K, and therefore, the output data DD are obtained by delaying the data DC by one clock time period ΔT.

Thus, according to the first embodiment, during a stall period where the change of the flip-flops FF$_{11}$, FF$_{12}$, . . . , FF$_{21}$, FF$_{22}$, . . . , FF$_{31}$, FF$_{32}$, . . . is unnecessary, the generation of the clock signals CLK1, CLK2, CLK3, . . . is stopped, thus reducing the power consumption.

An actual power consumption of the pipeline processing apparatus of FIG. 4 will be explained as compared with that of the pipeline processing apparatus of FIG. 1. The power consumption of the pipeline processing apparatus of FIG. 4 is calculated below. Here, the following conditions are assumed:

an input capacity of the clock signal CLK to each flip-flop=0.06 pF;

an internal load capacity of each flip-flop=0.07 pF;

an input capacity of each of the OR circuits G$_1$, G$_2$, . . . =0.10 pF;

an internal load capacity of each of the OR circuits G$_1$, G$_2$, . . . =0.50 pF;

the number of the flip-flops FF$_{11}$, FF$_{12}$, . . . =40;

the number of the flip-flops FF$_{21}$, FF$_{21}$, . . . =20;

the number of the flip-flops FF$_{31}$, FF$_{32}$, . . . =30;

an internal load capacity of the logic gate combination circuit C$_1$=20 pF;

an internal load capacity of the logic gate combination circuit C$_2$=10 pF;

V$_{DD}$=5V;

the frequency f$_c$ of the clock signal CLK=50 MH$_z$;

the probability of "1" within the stall signal STL=⅖, i.e., the frequency of the stall signal STL=⅖·50 MH$_z$; and the frequency of other logic signals=f$_s$/4.
Therefore, from the equation (1), $$P = (2 \cdot 0.06 + 3 \cdot 0.10) \cdot 10^{-12} \times 5^2 \times 50 \cdot 10^6 + \quad (5)$$
$$(3 \cdot 0.50 + (40 + 20 + 30) \cdot 0.06) \cdot 10^{-12} \times 5^2 \times 2/5 \cdot 50 \cdot 10^6 +$$
$$(40 + 20 + 30) \cdot 0.07 \cdot 10^{-12} \times 5^2 \times 1/4 \cdot 2/5 \cdot 50 \cdot 10^6 +$$
$$(2 \cdot 0.07 + 3 \cdot 0.10) \cdot 10^{-12} \times 5^2 \times 2/5 \cdot 50 \cdot 10^6 +$$
$$(20 + 10) \cdot 10^{-12} \times 5^2 \times 1/4 \cdot 2/5 \cdot 50 \cdot 10^6$$

where the first term is a power consumption dissipated by the clock signal CLK; the second term is a power consumption dissipated in the OR circuits G$_1$, G$_2$ and G$_3$ and by the clock signals CLK1, CLK2 and CLK3; the third term is a power consumption dissipated within the flip-flops; the fourth term is a power consumption dissipated by the stall signal STL; and the fifth term is a power consumption dissipated in the logic gate combination circuits C$_1$ and C$_2$. The equation (5) is represented by $$P = (0.53 + 3.45 + 0.79 + 0.25 + 3.75) \cdot 10^{-3} \quad (6)$$
$$= 8.74 \, mW$$

Thus, the entire power consumption (8.74 mW) in the first embodiment, validating all the rise edges of the clock signals CLK1, CLK2 and CLK3 can be reduced by 29 percent as compared with that (12.34 mW) of the prior art pipeline processing apparatus of FIG. 1. This is mainly because the power consumption by the clock signals is reduced by 42 percent as compared with the prior art pipeline processing apparatus of FIG. 1. Note that the reduction in power consumption by deleting the sectors SEL$_1$, SEL$_2$, . . . and the increase in power consumption by delaying the stall signal STL cancel each other.

Figure 6:
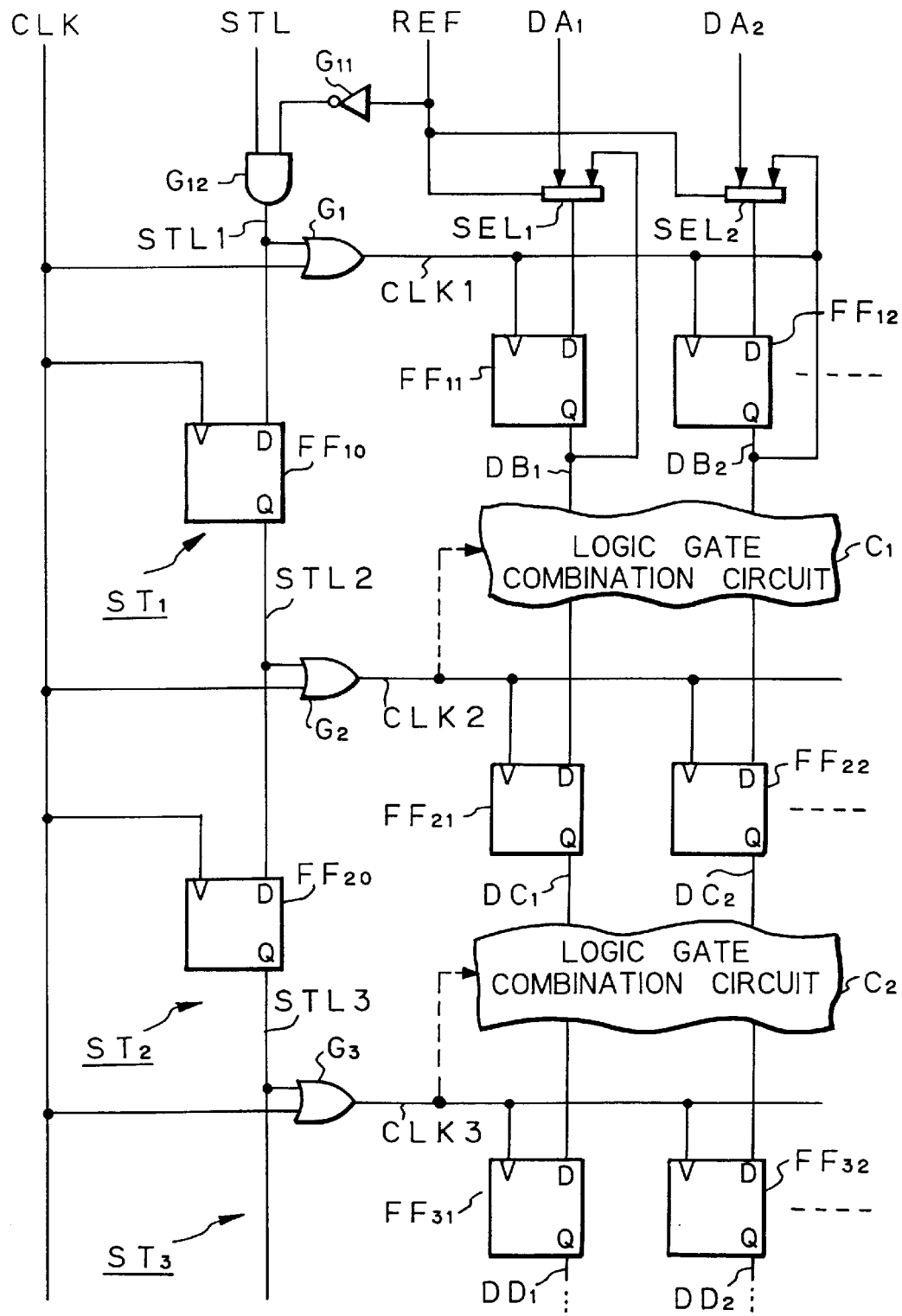
FIG. 6 is a circuit diagram illustrating a second embodiment of the pipeline processing apparatus according to the present invention.

In FIG. 6, which illustrates a second embodiment of the present invention using dynamic type flip-flops as illustrated in FIG. 3B, an inverter G$_{11}$, an AND circuit G$_{12}$, selectors SEL$_1$, SEL$_2$, . . . are added to the elements of FIG. 4, to thereby carry out a refresh operation by a refresh signal REF. The refresh signal REF is a clock pulse signal which is made high (="1") for every definite time period such as several μs.

The operation of the pipeline processing apparatus of FIG. 6 will now be explained with reference to FIGS. 7A throuth 7K. When the refresh signal REF is "0", the operation of the pipeline processing apparatus of FIG. 6 is the same as that of the pipeline processing apparatus of FIG. 4 (see non-refresh mode of FIGS. 7A through 7K). That is, the output signal of the inverter G$_{11}$ is "1", so that the AND circuit G$_{12}$ passes the stall signal STL therethrough. In this case, STL1=STL. Simultaneously, the selectors SEL$_1$', SEL$_2$', . . . select the data DA$_1$, DA$_2$, . . . , respectively.

Figure 7:
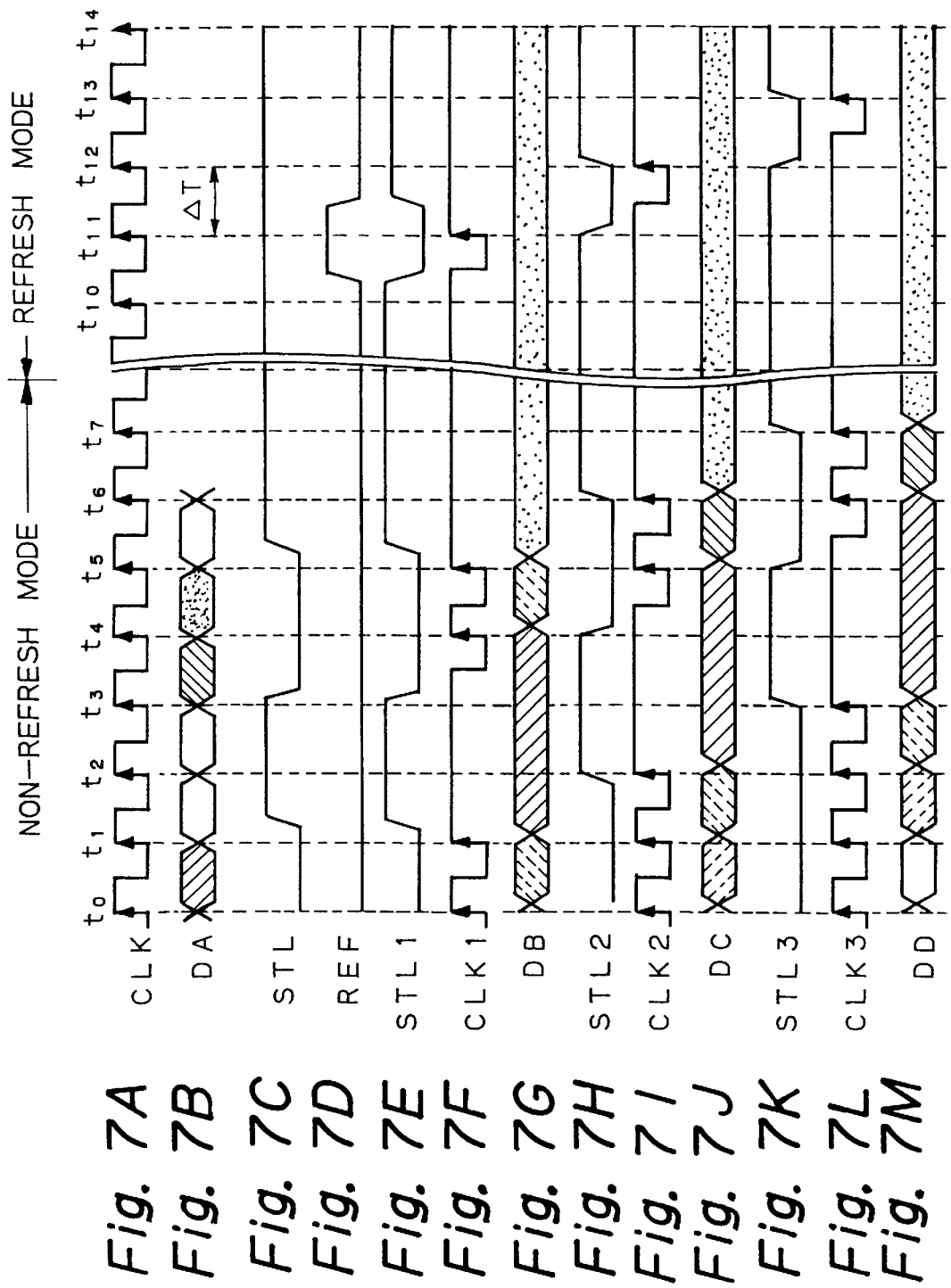
FIGS. 7A 7B, 7C, 7D, 7E, 7F, 7G, 7H, 7I, 7J, and 7K are timing diagrams showing the operation of the circuit of FIG. 6.

When the stall signal STL1 (=STL) is "1" and accordingly, the stall signals STL2 and SLTL3 are "1", the refresh signal REF is made "1", as shown in FIG. 7D, so that the control enters a refresh mode. That is, the selectors SEL$_1$', SEL$_2$', . . . select the outputs DB$_1$, DB$_2$, . . . (=DB), respectively, of the flip-flops FF$_{11}$, FF$_{12}$, . . . , Also, since the refresh signal REF (="1") is inverted by the inverter G$_{11}$ and is supplied to the AND circuit G$_{12}$, the output signal of the AND circuit G$_{12}$ is "0" regardless of the stall signal STL. That is, the stall signal STL1 is "0" as shown in FIG. 7E. As a result, the clock signal CLK passes through the OR circuit G$_1$ only for a time period defined by the stall signal STL1 (="0"), so that the clock signal CLK1 is formed by the clock signal CLK, as shown in FIG. 7F. Therefore, the outputs $DB_1$, $DB_2$, ... (=DB) of the flip-flops $FF_{11}$, $FF_{12}$, ... are again written thereinto, thus refreshing the flip-flops $FF_{11}$, $FF_{12}$, ....

Also, the stall signal STL1 is latched by the flip-flop $FF_{10}$, and as a result, the stall signal STL2 is "0" for one clock time period ΔT, as shown in FIG. 7H. Therefore, the clock signal CLK passes through the OR circuit $G_2$ only for a time period defined by the stall signal STL2 (="0"), so that the clock signal CLK2 is formed by the clock signal CLK, as shown in FIG. 7I. Thus, the outputs $DC_1$, $DC_2$, ... (=DC) of the flip-flops $FF_{21}$, $FF_{22}$, ... are again written thereinto, thus refreshing the flip-flops $FF_{21}$, $FF_{22}$, ....

Further, the stall signal STL2 is latched by the flip-flop $FF_{20}$, and as a result, the stall signal STL3 is "0" for one clock time period ΔT, as shown in FIG. 7K. Therefore, the clock signal CLK passes through the OR circuit $G_3$ only for a time period defined by the stall signal STL3 (="0"), so that the clock signal CLK3 is formed by the clock signal CLK, as shown in FIG. 7L. Thus, the outputs $DD_1$, $DD_2$, ... (=DD) of the flip-flops $FF_{31}$, $FF_{32}$, ... are again written thereinto, thus refreshing the flip-flops $FF_{31}$, $FF_{32}$, ....

Note that the provision of the selectors $SEL_1$, $SEL_2$, ... at the prestages of the flip-flops $FF_{11}$, $FF_{12}$, ... makes it definitely possible to carry out a refresh operation upon the flip-flops $FF_{11}$, $FF_{12}$, ... even when the data DA ($DA_1$, $DA_2$, ...) are changed during a refresh mode. Contrary to this, during a stalling period, the input values of the flip-flops $FF_{21}$, $FF_{22}$, ..., $FF_{31}$, $FF_{32}$, ... are not changed, and therefore, no selectors are provided at the prestages of the flip-flops $FF_{21}$, $FF_{22}$, ..., $FF_{31}$, $FF_{32}$, ....

Thus, according to the second embodiment, during a stall period where the change of the flip-flops $FF_{11}$, $FF_{12}$, ..., $FF_{21}$, $FF_{22}$, ..., $FF_{31}$, $FF_{32}$, ... is unnecessary, the generation of the clock signals CLK1, CLK2, CLK3, ... is stopped, thus reducing the power consumption.

The actual power consumption of the pipeline processing apparatus of FIG. 6 will be explained as compared with that of the pipeline processing apparatus of FIG. 1. The power consumption of the pipeline processing apparatus of FIG. 6 is calculated below. Here, the following conditions are assumed:

- an input capacity of the clock signal CLK to each flip-flop=0.03 pF;
- an internal load capacity of each flip-flop=0.04 pF;
- an input capacity of the refresh signal REF to each of the selectors $SEL_1'$, $SEL_2'$, ... =0.05 pF;
- an internal load capacity of each of the selectors $SEL_1'$, $SEL_2'$, ... =0.05 pF;
- an input capacity of each of the OR circuits $G_1$, $G_2$, ... =0.10 pF;
- an internal load capacity of each of the OR circuits $G_1$, $G_2$, ... =0.50 pF;
- the number of the flip-flops $FF_{11}$, $FF_{12}$, ... =40;
- the number of the flip-flops $FF_{21}$, $FF_{22}$, ... =20;
- the number of the flip-flops $FF_{31}$, $FF_{32}$, ... =30;
- an internal load capacity of the logic gate combination circuit $C_1$=20 pF;
- an internal load capacity of the logic gate combination circuit $C_2$=10 pF;
- $V_{DD}$=5V;
- the frequency $f_c$ of the clock signal CLK=50 MHz;
- the probability of "1" within the stall signal STL=2/5, i.e., the frequency of the stall signal STL=2/5·50 MHz;
- the frequency of other logic signals=$f_s/4$; the probability of "1" within the refresh signal REF=1/200; and the probability of "1" within the stall signals STL1, STL2 AND STL3=2/5+1/200.

Therefore, from the equation (1), $$P = (2 \cdot 0.03 + 3 \cdot 0.10) \cdot 10^{-12} \times 5^2 \times 50 \cdot 10^6 + \quad (7)$$

$$(3 \cdot 0.50 + (40 + 20 + 30) \cdot 0.03) \cdot 10^{-12} \times 5^2 \times$$

$$(2/5 + 1/200) \cdot 50 \cdot 10^6 +$$

$$(40 + 20 + 30) \cdot 0.04 \cdot 10^{-12} \times 5^2 \times 1/4 \cdot 2/5 \cdot 50 \cdot 10^6 +$$

$$(2 \cdot 0.04 + 3 \cdot 0.10) \cdot 10^{-12} \times 5^2 \times (2/5 + 1/200) \cdot 50 \cdot 10^6 +$$

$$(20 + 10) \cdot 10^{-12} \times 5^2 \times 1/4 \cdot 2/5 \cdot 50 \cdot 10^6 +$$

$$40 \cdot 0.04 \cdot 10^{-12} \times 5^2 \times 1/200 \cdot 50 \cdot 10^6 +$$

$$40 \cdot 0.05 \cdot 10^{-12} \times 5^2 \times 1/4 \cdot (2/5 + 1/200) \cdot 50 \cdot 10^6$$

where the first term is a power consumption dissipated by the clock signal CLK; the second term is a power consumption dissipated in the OR circuits $G_1$, $G_2$ and $G_3$ and by the clock signals CLK, CLK2 and CLK3; the third term is a power consumption dissipated within the flip-flops; the fourth term is a power consumption dissipated by the stall signal STL; and the fifth term is a power consumption dissipated in the logic gate combination circuits $C_1$ and $C_2$; the sixth term is a power consumption dissipated in the selectors $SEL_1'$, $SEL_2'$, .... The equation (7) is represented by $$P = (0.45 + 1.44 + 0.45 + 0.19 + 3.75 + 0.01 + 0.25) \cdot 10^{-3} \quad (8)$$

$$= 6.54 \text{mW}$$

Thus, the entire power consumption (6.54 nW) in the second embodiment, validating all the rise edges of the clock signals CLK1, CLK2 and CLM3 can be reduced by 24 percent as compared with that (8.63 mW) of the prior art pipeline processing apparatus of FIG. 1. This is mainly because the power consumption by the clock signals is reduced by 42 percent as compared with the prior art pipeline processing apparatus of FIG. 1.

In the above-mentioned second embodiment as illustrated in FIG. 6, the logic gate combination circuits $C_1$ and $C_2$ can be of a dynamic type. In this case, the clock signals CLK2 and CLK3 are supplied to the logic gate combination circuits $C_1$ and $C_2$, respectively, as indicated by dotted arrows in FIG. 6. That is, when the clock signal CLK2 (CLK3) is high, the logic gate combination circuit $C_1$ ($C_2$) is precharged, while when the clock signal CLK2 (CLK3) is low, the logic gate combination logic circuit $C_1$ ($C_2$) carries out a logic operation. Thus, since the clock signal CLK2 (CLK3) masked by the stall signals STL2 (STL3) is supplied to the logic gate combination circuit $C_1$ ($C_2$), the power consumption dissipated by the clock signals can be reduced. In the prior art pipeline processing apparatus of FIG. 1, the clock signal CLK which has more transitions than the clock signals CLK2 and CLK3 may be supplied directly to the logic gate combination circuits $C_1$ and $C_2$ which are of a dynamic type, thus increasing the power consumption.

Figure 8:
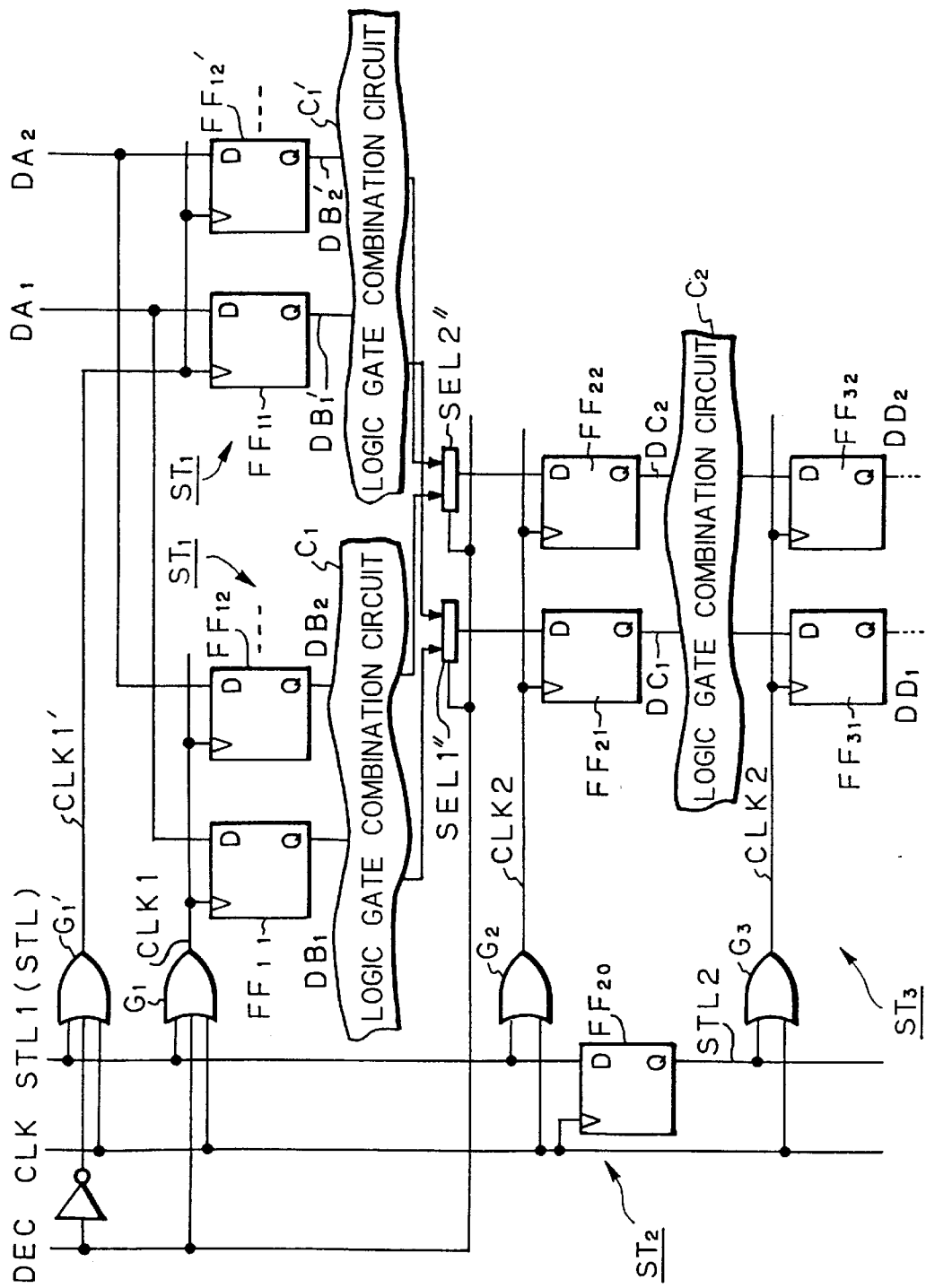
FIG. 8 is a circuit diagram illustrating a third embodiment of the pipeline processing apparatus according to the present invention.

In FIG. 8, which illustrates a third embodiment of the present invention, flip-flops $FF_{11}'$, $FF_{12}'$, ... and a logic gate combination circuit $C_1'$ are connected in parallel to the flip-flops $FF_{11}$, $FF_{12}$, ... and the logic gate combination $C_1$ of FIG. 4. In other words, one first stage consists double-stages designated by sub stages $ST_1$ and $ST_1'$. The sub stages $ST_1$ and $ST_1'$ are switched by OR circuits $G_1$ and $G^{1'}$ and selectors $SEL_1''$ and $SEL_2''$ which are controlled by a decoding signal DEC.

In order to operate either the logic gate combination circuit $C_1$ or the logic gate combination circuit $C_1'$, either the clock signal CLK1 or the clock signal CLK1' is generated. For example, when the decoding signal DEC is "1", the clock signal CLK1 is clocked, while when the decoding signal DEC is "0", the clock signal CLK1' is clocked.

In the third embodiment as illustrated in FIG. 8, if the logic gate combination circuit $C_1$ forms an arithmetic and logic unit (ALU), the logic gate combination circuit $C_1'$ forms a barrel shifter, and the logic gate combination circuit $C_2$ forms a data cache memory, the pipeline processing apparatus of FIG. 8 can serve as a microprocessor.

Thus, in the third embodiment as illustrated in FIG. 8, even when there is a logic gate combination circuit which is hardly operated, a surplus power consumption therefor can be reduced.

In FIG. 8, a stage other than the first stage can be double-staged. Also, a multi-stage greater than a double-stage can be adopted instead of the double-stage.

As explained hereinbefore, according to the present invention, in a pipeline processing apparatus, since power consumption dissipated by a clock signal can be reduced, an overall power consumption dissipated in the pipeline processing apparatus can be reduced.

What is claimed is:

1. A pipeline processing apparatus comprising:

a plurality of serially-connected stages, each including a plurality of first flip-flops and a logic gate combination circuit connected to outputs of said first flip-flops;

a plurality of serially-connected second flip-flops coupled to respective ones of said stages for delaying a main stall signal to generate a plurality of stall signals different in phase from each other having a delay time therebetween;

first gate means for passing a system clock signal in accordance with said main stall signal to said first flip-flops of a first stage of said stages; and a plurality of gate means, each connected to one of said second flip-flops, each for passing said system clock signal in accordance with respective ones of said stall signals to respective ones of said first flip-flops of said stages except for said first stage.

2. An apparatus as set forth in claim 1, wherein said first flip-flops of said stages are of a dynamic type, said apparatus further comprising means for receiving a refresh signal coupled to said first stage to stop generation of said main stall signal.

3. An apparatus as set forth in claim 2, further comprising selector means for feeding back output signals of said first flip-flops of said first stage to inputs thereof in response to said refresh signal.

4. An apparatus as set forth in claim 2, wherein said logic gate combination circuit is of a dynamic type, said logic gate combination circuit being connected to one of said gate means to receive said system clock signal, so that said logic gate combination circuit carries out a precharging operation and a logic operation alternatively.

5. An apparatus as set forth in claim 1, wherein at least one of said stages includes a plurality of parallel-connected sub-stages, said apparatus further comprising decoding means for receiving a decoding signal to select one of said sub-stages.

* * * * *